United States Patent [19]

Caslavka

[11] Patent Number: 5,159,548
[45] Date of Patent: Oct. 27, 1992

[54] APPARATUS AND METHOD FOR PRIORITY PROCESSING OF FINANCIAL DOCUMENTS USING VIDEO IMAGE CAPTURE

[75] Inventor: David D. Caslavka, Minnetonka, Minn.

[73] Assignee: BancTec, Inc., Dallas, Tex.

[21] Appl. No.: 560,019

[22] Filed: Jul. 27, 1990

Related U.S. Application Data

[63] Continuation of Ser. No. 428,476, Oct. 30, 1989, abandoned, which is a continuation of Ser. No. 208,363, Jun. 17, 1988, abandoned.

[51] Int. Cl.⁵ ............................ G06K 5/00; B07C 1/00
[52] U.S. Cl. ...................................... 364/408; 235/435
[58] Field of Search ........................ 364/401, 406, 408; 382/57; 235/432, 475

[56] References Cited

U.S. PATENT DOCUMENTS

| | | | |
|---|---|---|---|
| 4,264,808 | 4/1981 | Owens et al. | 235/432 |
| 4,510,619 | 4/1985 | LeBrun et al. | 235/432 |
| 4,555,617 | 11/1985 | Brooks et al. | 235/379 |
| 4,564,752 | 1/1986 | Lepic et al. | 382/57 |
| 4,641,753 | 2/1987 | Tamada | 382/57 |
| 4,722,444 | 2/1988 | Murphy et al. | 382/7 |

OTHER PUBLICATIONS

"Image Processing" Its Potential For Bank Use, *Bank Administration*, pp. 52 & 54; Joun Bone vol. 63n7, Jul. 1987.

*Primary Examiner*—Gail O. Hayes

[57] ABSTRACT

Financial documents, such as checks and deposit slips, are processed by capturing a video image of each document and sorting each document into a predetermined rehandle pocket during a prime pass, prior to proof of deposit processing. Particular one of the documents are selected for priority processing. Selected data is read from the captured images of the selected documents and any errors are corrected to create verified data, including balanced deposit information. The selected documents are then encoded with machine readable data indicative of the balanced deposit information and are further sorted into predetermined kill pockets during a rehandle pass.

6 Claims, 3 Drawing Sheets

APPARATUS AND METHOD FOR PRIORITY PROCESSING OF FINANCIAL DOCUMENTS USING VIDEO IMAGE CAPTURE

This is a continuation of co-pending application Ser. No. 07/428,476 filed on Oct. 30, 1989, which is a continuation of prior co-pending application Ser. No. 07/208,363, filed on Jun. 17, 1988, both now abandoned.

FIELD OF THE INVENTION

This invention relates to document processing systems and, in particular, to systems adapted for processing financial items such as checks and deposit slips.

1. Background of the Invention

Financial items such as checks and drafts are processed and presented according to a schedule established by banking policies. Banking personnel are assisted by automatic document processors which read and sort financial items. Some processing steps such as proof of deposit, involving amount keying and balancing, require operator handling and input.

In the processing of credit and debit items such as bank checks and deposit slips, in addition to the direct overhead cost of processing such items, banks and other financial institutions also incur a cash reserve obligation proportional to the gross amount of unpaid transit items which are being processed. Because of the volumes handled large banks, for example an average of five to six million items per day, with a peak of as many as 14 million items per day, there is a substantial financial incentive for banks and processing institutions to minimize the actual length of time that transit items are held and to physically present those items for payment as quickly as possible.

2. Description of the Prior Art

An improved financial document processing system now in use utilizes a modular transport including a CPU, a digital image capture system, document encoding system, document endorsing system, audit trail printer, an in-line microfilm record system and a high speed document sorter. Associated video terminals provide visual images of documents processed by the system. Selected documents are read, endorsed, annotated with an audit trail, digitally imaged, filmed and sorted in a single continuous pass, as disclosed in U.S. Pat. No. 4,510,619. Other document processor improvements are disclosed in the following patents:

|  |  |  |
| --- | --- | --- |
| 4,672,186 | 4,492,161 | 4,397,460 |
| 3,992,697 | 3,676,847 | 3,709,525 |
| 3,613,080 | 3,594,549 | 3,487,371 |
| Canadian 1,221,177 | | Canadian 1,197,927 |

Conventional document processing systems require manual transfer of documents to off-line machines to accomplish slower speed proofing operations including keying, encoding and balancing. The speed of execution of these peripheral functions is limited in some instances by the speed of human operators, for example in the proofing process. Moreover, the overall processing time is directly proportional to the gross number of items being processed and sorted. It will be appreciated that processing large volumes of items is a time-consuming process, and can be costly when deadlines are not met. Accordingly, there is a continuing interest in improving the efficiency of item processing operations.

SUMMARY OF THE INVENTION

During the processing of financial items, the most labor intensive operation is the proof of deposit (POD) process involving substantial amount of operator time and intervention including amount keying, balancing and adjustments. The check handling system of the present invention improves the POD process by reducing the amount of operator intervention required to accomplish these functions. The system of the present invention expedites the processing of transit work by proofing deposits using video images acquired during an image capture pass of all items. Electronic images of the items are presented on the video screen of an Image Display Terminal (IDT) for keying of amount data without requiring physical handling of the items by an operator.

A further saving of processing time is obtained by deferring encoding of amount data until the items are read and sorted into a kill pocket during a rehandle pass. According to one aspect of the present invention, the proofing operation including key entry of amount, adjustments and balancing, is performed after an image capture pass, with a balanced account data string being loaded into an on-line host computer. Because data is typically imprinted by a relatively slow printer, the slower encoding operations are deferred until after the image capture pass in which the items are separated into high priority transit rehandle pockets and low priority "On-Us" kill pockets. That is, the priority transit items are separated, batched and subsequently processed in a rehandle encode pass in which each high priority transit item is read, encoded and sorted to a predetermined kill pocket. During the image capture pass, low priority "On-Us" items are separated, batched and set aside for a rehandle pass after the priority deadline.

Because of the speed limitation of encoding devices, the image capture pass is performed by a reader/sorter transport which digitizes and records images of the items at a relatively high rate. The rehandle encode pass is performed separately in connection with the same or a comparable reader/scanner which has amount encoding capability. Because of the large numbers of items being processed, two or more such reader/scanner transports may be utilized, with one transport performing image capture passes at a relatively high item processing rate, and the other performing the rehandle encode pass at a relatively slower item processing rate as limited by the speed of the encoder.

The processing system of the preferred embodiment improves the through-put of proof operations, expedites the processing of transit items, minimizes the physical handling of items by operators, simplifies and assists the balancing operation.

The advantages of the present invention will be further appreciated by those skilled in the art upon reading the detailed description which follows in conjunction with the attached drawings.

DETAILED DESCRIPTION OF THE PREFERRED EMBODIMENT

Figure 1:
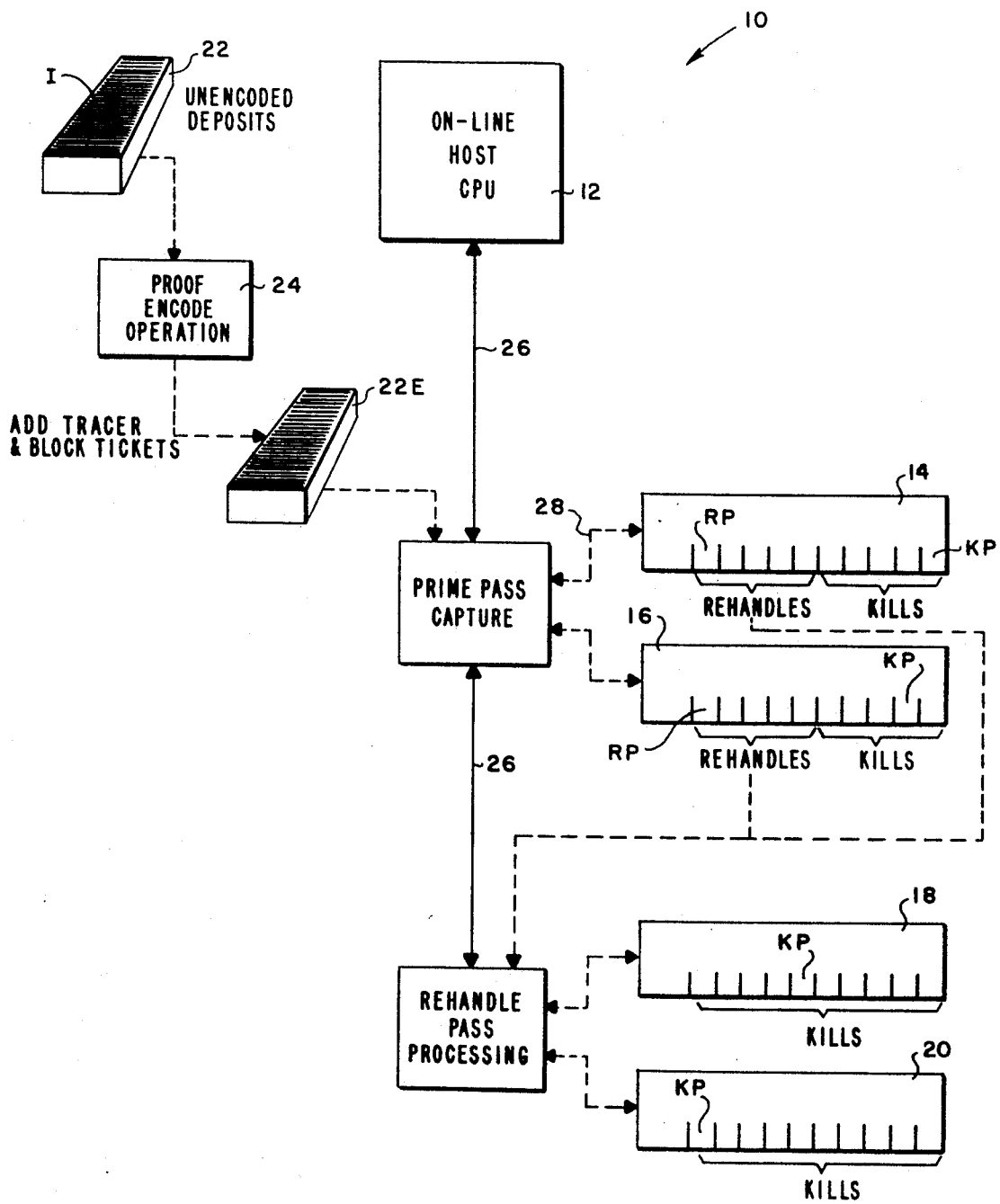
FIG. 1 is a simplified block diagram of a conventional check processing system.

In the description which follows, like parts are indicated throughout the specification and drawings with the same reference numerals, respectively.

Referring now to FIG. 1, a conventional check processing system 10 includes an on-line host CPU 12 and a plurality of reader/sorter transports 14,16,18 and 20 for automatically sorting a batch 22 of un-encoded deposit items I. The un-encoded deposit items I are proofed and encoded off-line by key operators with the assistance of an encoder 24. During this step, the operators enter the amount data, and endorse each item. After the items have been adjusted, balanced and encoded, they are gathered in a group or batch 22E for sorting during a prime pass capture operation.

A batch 22E of 300-500 proofed items are processed in a prime pass capture operation in which the items ar read and sorted in the transports 14,16 under the control of the on-line host CPU 12. The host CPU 12 has a host sort control software program (HSCS). The automatic reader/sorter transports 14,16 are capable of reading MICR data encoded on the items and sorting them at a high rate of items per hour. The reader/sorter transports 14,16 perform a variety of functions, including reading the encoded MICR data, producing a microfilm record of the item, and imprinting an endorsement on the back of the item, and then performing a pocket sort.

The HSCS software program contains algorithms to assist in the balancing of deposits. These algorithms determine the location of suspected mis-keyed items and maintain pointers to suspected missing and free items within a unit of work. The software program also provides means for generating adjustment entries for out-of-proof deposits, for creating adjustment tickets for insertion into customer file and to automatically prepare depositor adjustment notices.

The reader/sorter transports 14,16,18 and 20 typically have twelve to thirty-six pockets some of which are designated as "rehandle" pockets RP, and others of which are designated as "kill" pockets KP, with each pocket typically corresponding to a particular clearing house, bank, or group of banks. The on-line host CPU 12 issues download sort instructions. As the items are read, the reader/sorter interprets the downloaded sort instructions which directs each item to a specific pocket. Additionally, the item data is uploaded via bus 26 into the memory of the host CPU 12.

The number of pockets required depends upon how many direct exchange relationships exist. Since some large banks may have more exchange relationships than available pockets, it becomes necessary to rehandle and sort the items repeatedly until all items have been assigned to a correspondent bank, or to a central clearing house, or to an "On-Us" pocket for items drawn on the processing bank.

During the prime pass capture operation, the batch 22E of proofed and encoded items are sorted into rehandle pockets RP and kill pockets KP. The rehandle items are batched and subsequently sorted by transports 18,20 under the direction and control of the on-line host CPU 12.

It will be appreciated that substantial processing time is needed for physically handling each item in the proof and encode operation, and that additional processing time is required for reading and sorting each encoded item in the prime pass capture step.

Figure 2:
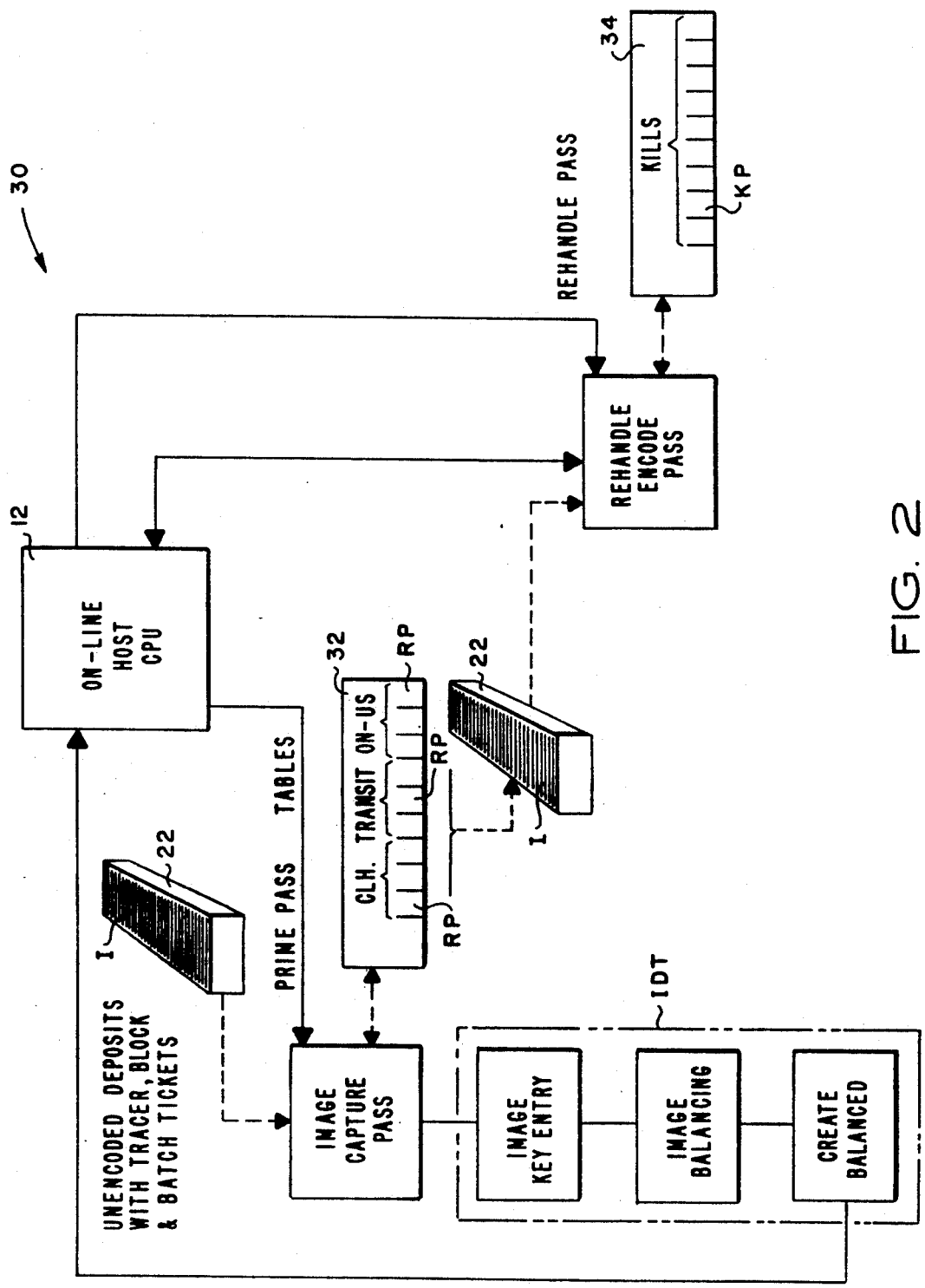
FIG. 2 is a simplified block diagram which illustrates the preferred embodiment of the present invention; and, FIG. 3 is a simplified block diagram which illustrates an alternative embodiment of the present invention.

Referring now to FIG. 2, the check handling system 30 of the present invention defers the encoding step until after the items have been proofed and balanced. Moreover, the processing of transit items is expedited by proofing the deposits using video images obtained during an image capture pass of all items, without requiring physical handling of the items by the operators. A further savings of processing time is obtained by deferring the encoding operation until after image capture pass in which the items are separated and subsequently processed in a rehandle encode pass. This permits low priority "On-Us" items to be separated, batched and set aside for a rehandle encode pass after the priority deadline, and high priority transit items to be processed on a high priority basis.

Figure 3:
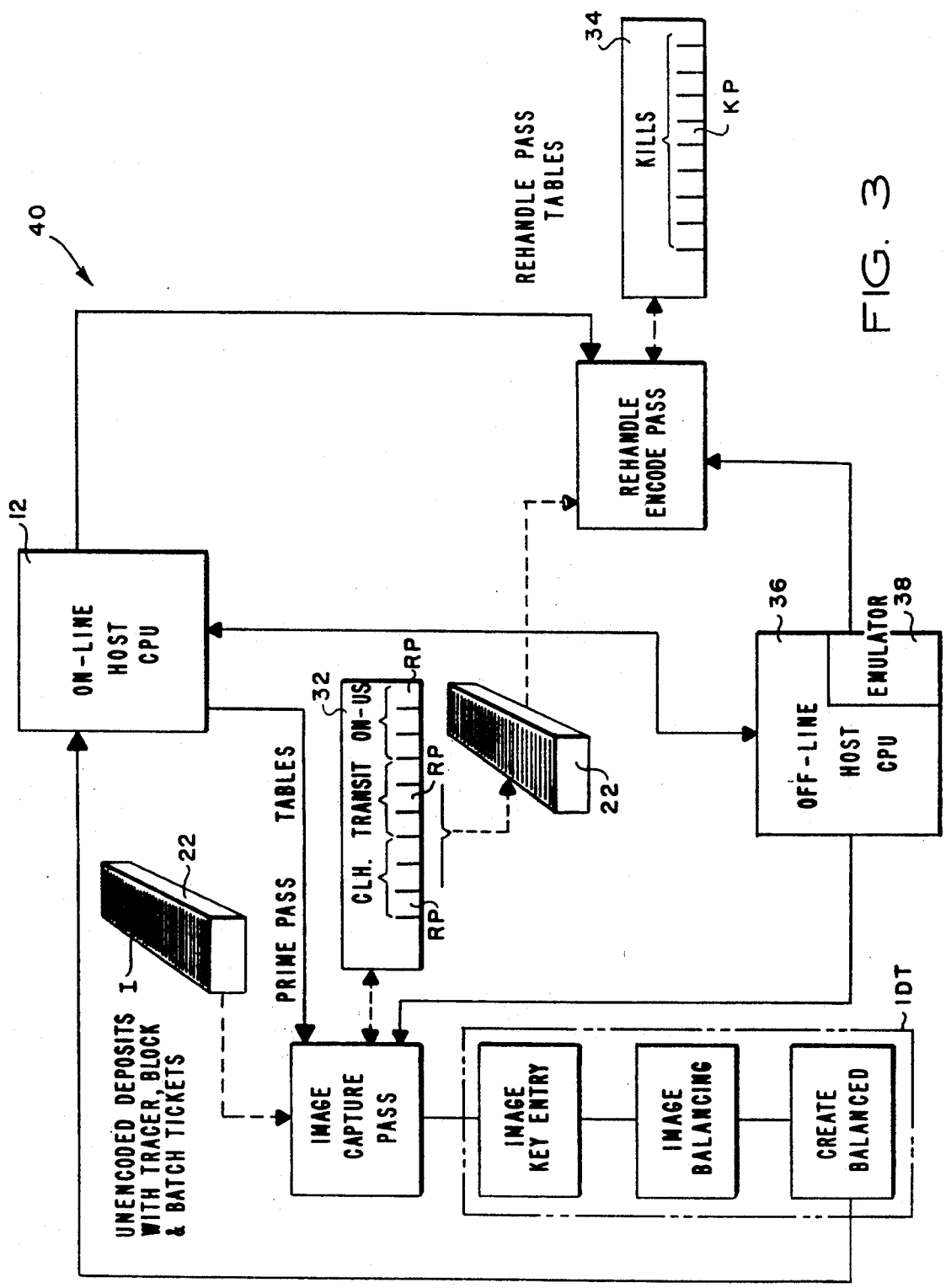

If the host CPU 12 cannot control the image capture operation and the reader/sorter encoder operation, then an off-line host CPU 36 with an emulator software 38 is required, as depicted in FIG. 3. The function of the off-line host CPU 36 is to control the image capture operation and communication with the on-line host CPU 12, and for reader/sorter control by the emulator software 38 in the off-line host CPU 36.

A video image of each item is acquired as the items are automatically fed on a transport 32. The images are communicated electronically to local image display terminals IDT to be used for MICR correction, data completion, keying of amounts and balancing of deposits.

Advantages of using video images for data entry/correction as opposed to referencing the physical item documents are increased keystroke productivity, reduced encoding errors and reduction in related document repair. By eliminating the need to reference the physical items there is less probablity of items being misplaced or lost.

As the deposit items are processed through the transport 32, the MICR data and the video image of each item is captured electronically. The electronic images are referenced on the image display terminal for correction of rejects, edit, key amounts and balance deposits, thereby completing the MICR data prior to encoding the items. According to this operational procedure, the equivalent of the conventional prime pass capture occurs before the items are amount encoded.

The reader/sorter portion of the transport 32 performs the following functions: (A) MICR read; (B) ink jet printing of item sequence numbers, depositor account number and other user defined data; (C) endorsing; (D) micro-filming; and (E) document sorting into rehandle pockets RP.

Deposit items are received in a document preparation area where they are visually checked and grouped in batches 22 of approximately three hundred items I each. At various times, the batches 22 are processed through the transport 32 where each item is video image captured and MICR data and capture sequence number data are assigned and printed on each item.

After the first batch 22 has been processed through the transport 32, the batch is then processed through the image display terminal for MICR repair and amount insertion. These processes permit the operators to complete or correct missing or rejected data and enter amounts using video images of the items as reference. If referral to the source document is necessary, the operator flags the item for document retrieval. Items flagged for document retrieval will be presented to another operator for supplying the specific information in question. Once information has been supplied, the deposit is updated accordingly.

As each batch is completed, each of the deposit items in the batch are trial-balanced. If a deposit is out-of-balance, the operator is given the opportunity to verify and correct where necessary the amounts in the records by displaying video images of the deposit slip and related items for comparison to the image captured amounts. The system also assists in balancing by use of various algorithms designed to locate transpositions, dropped digits and the like. If the deposit remains out-of-balance, the authorized operator instructs the system to generate an adjustment to the deposit which will bring the deposit in balance.

After all adjustments have been made, a balanced data string will be generated in the same sequence as the items are transported for subsequent uploading to the host CPU 12. This data string is uploaded to the on-line host and is used as an input to the rehandle transport for encoding of amount data and sorting to kill pockets KP.

During the image capture pass, the MICR data and video image of each item is captured, and a capture sequence number (CSN) is assigned and stored on disc for proof operations. The CSN is an eight digit number which contains one digit transport identification, one digit processing cycle identification, and a six digit sequence number. The CSN permits reconstruction of the deposit/batch document sequence should this be necessary. Additionally, the video image of each item is captured, compacted and stored on disc in batch files in the same sequence as the MICR data records. This video image record is cross-referenced from the MICR data record. All items are microfilmed during the image capture pass. The sequence of the control items established during document preparation is checked and the operator is informed of any discrepancies.

The proofing of deposit items is accomplished on one or more image display terminals (IDT) by proof operators. The actual video image of the item is displayed along with the captured MICR data. The proof operation is divided into three major functions: MICR correction/edit, amount insertion and deposit balancing. In the case of MICR correction and amount insertion, only one item is displayed for observation by the operator at a time. Therefore, several operators may receive work from the same deposit. In the case of balancing, entire deposits are assigned to an operator for balancing. Only deposits which the system has found to be out-of-balance will require action by the operators.

The first step in the proof operation is MICR correction/edit. In this operation, any rejected MICR items will automatically be presented to the operator for repair or completion. This is accomplished by displaying the video image of the item as well as the MICR data record and indicating to the operator what information is to be corrected or completed. The image is used for visual reference to complete or correct the MICR data.

The next step in the proof operation is amount keying. As each batch is completed and released from MICR correction/edit, it is scheduled for amount keying. In this step the proof operators are concerned only with keying the dollar amount of the item.

The third step in the proof operation i deposit balancing. There are three levels of balancing: on-line balancing which requires no operator intervention; computer-assisted balancing in which the system identifies suspect items and potential errors and flags these items for verification; and interactive balancing which provides the operator with both MICR data and video images relative to the deposit. After all deposits within a batch are balanced, a batch total is generated and logged.

After balancing has been completed, a balanced data string is created. The batches which are associated with a specific tracer group are acquired in the sequence in which they were processed during the image capture pass. The data is then posted to process buffers. These buffers are transmitted to the on-line host CPU 12 as input to the host program which monitors and directs operation of the reader/sorter transport 32. The host CPU 12 converts the process buffer data into a I string and posts them to the host databases.

During the image comparison operation, an operator observes the electronic images of the items and manually keys in the amount. Deposit balancing is then accomplished by the online host CPU 12, with the operator directed adjustments performed as required for exceptions. After this step, a balanced data string is created and is uploaded in the memory of the online host CPU 12. After all items have been processed and the proofed and balanced data string has been loaded into the host memory, the proofed items 22B are grouped in a batch and are encoded and sorted through a reader/sorter transport 34 under the direction of the on-line host CPU 12.

A document encoder is included within the transport 34 and encodes items at high speed, utilizing read images and keyed amounts from previously balanced deposits. Since the items are encoded after the deposits have been balanced, the number of encoding errors is significantly reduced.

According to an important feature of the preferred embodiment, the items are distributed into rehandle pockets RP which correspond with at least two categories of correspondent banks, "On-Us" and "Transit". A third category, "Clearing House", (CLH) having one or more kill pockets KP, may also be utilized. Because most of the items processed by the bank will be low priority "On-Us" items, these low priority items are separated and are set aside for processing at a later time after priority hours. The number of low priority "On-Us" items may constitute as much as 60-70% of the total number of items to be processed. Accordingly, the volume to be encoded and further sorted is substantially reduced, with the low priority items being set aside for processing after the priority deadlines. According to this arrangement, the relatively slow encoding operation for the smaller number of high priority transit items can be performed during the limited high priority processing time.

Referring now to FIG. 3, the rehandle encode pass is accomplished under the direction of the on-line host CPU 12, an off-line host computer 36, a processing emulator 38 and a reader/sorter 34 which includes an encoder. After the transit items have been proofed, adjusted and balanced, they are batched and processed through the reader/sorter 34 and encoded under the direction of the on-line host which downloads the balanced data string and sort pocket table information to the emulator. The items are then scanned, data-matched, amount encoded and sorted to pre-assigned kill pockets.

If the host CPU 12 cannot control the image capture operation and the reader/sorter encoder operation, then an offline host CPU 36 with an emulator software 38 is required. The function of the off-line host CPU 36 is to control the image capture operation and communication with the on-line host CPU 12, and for reader/sorter control by the emulator software 38 in the offline host CPU 36.

What is claimed is:

1. Apparatus for processing documents, comprising:
   means for capturing a video image of each document;
   means for sorting the documents according to predetermined priority criteria; and
   means for analyzing the video images of at least some of the documents to verify selected data thereon after the documents have been sorted according to the predetermined priority criteria.

2. The apparatus of claim 1 further including means for encoding the documents with machine readable data after the selected data thereon has been verified.

3. The apparatus of claim 2 further including computing means having a memory for storing verified data, said verified data including amount information for each document, said encoding means for encoding each document with machine readable data indicative of the corresponding amount information stored in said memory.

4. A method for processing financial items, comprising:
   capturing a video image of each item and sorting each item into a predetermined pocket during a prime pass capture;
   selecting particular ones of the items for priority processing;
   reading selected data from the captured images of said selected items and correcting errors in the selected data to create verified data, said verified data including balanced deposit information; and
   encoding said particular ones of said items with machine readable data indicative of the balanced deposit information and sorting each of the encoded documents into a predetermined pocket during a rehandle pass.

5. A method for processing documents, comprising:
   capturing a video image of each document;
   sorting the documents according to a sort control program, said sorting including the sorting of each of the documents according to predetermined priority criteria into predetermined rehandle pockets in accordance with said sort control program during a prime pass;
   analyzing the video image of at least some of the documents to verify selected data thereon after the documents have been sorted;
   encoding said at least some of the documents with machine readable data after the selected data has been verified;
   and sorting said at least some of the documents into predetermined kill pockets in accordance with said sort control program during a rehandle pass after the selected data has been verified and after the machine readable data has been encoded.

6. A method for processing financial items, comprising:
   capturing a video image of each item and sorting each item into a predetermined pocket during a prime pass;
   selecting particular ones of the items for priority processing; and
   reading selected data from the captured image of each of said selected items and correcting errors in the selected data to create verified data, said verified data including balanced deposit information.

* * * * *